(12) United States Patent
Fischer et al.

(10) Patent No.: US 8,623,978 B2
(45) Date of Patent: Jan. 7, 2014

(54) PROCESS FOR THE PREPARATION OF LOW-PEROXIDE CROSSLINKED VINYLLACTAM POLYMER

(75) Inventors: Frank Fischer, Kirchheim (DE); Erik Bohrer, Maxdorf (DE); Angelika Maschke, Mannheim (DE); Karl Kolter, Limburgerhof (DE); Michael Kerber, Weinheim (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/303,275

(22) Filed: Nov. 23, 2011

(65) Prior Publication Data

US 2012/0130028 A1 May 24, 2012

Related U.S. Application Data

(60) Provisional application No. 61/416,311, filed on Nov. 23, 2010.

(51) Int. Cl.
*C08F 26/10* (2006.01)
*C08F 26/06* (2006.01)

(52) U.S. Cl.
USPC ............................ 526/264; 526/263; 526/204

(58) Field of Classification Search
USPC ........................................ 526/204, 264, 263
See application file for complete search history.

(56) References Cited

U.S. PATENT DOCUMENTS

| | | | |
|---|---|---|---|
| 2,821,519 A | 1/1958 | Glickman | |
| 3,277,066 A | 10/1966 | Grosser et al. | |
| 4,451,582 A | 5/1984 | Denzinger et al. | |
| 5,094,867 A | 3/1992 | Detering et al. | |
| 5,286,826 A * | 2/1994 | Shih et al. | 526/264 |
| 5,393,854 A * | 2/1995 | Tseng et al. | 526/264 |
| 5,599,898 A * | 2/1997 | Hartmann et al. | 528/310 |
| 6,080,397 A | 6/2000 | Pfirrmann | |
| 6,239,206 B1 | 5/2001 | Fussnegger et al. | |
| 6,331,333 B1 | 12/2001 | Wu et al. | |
| 6,498,231 B2 | 12/2002 | Tomihisa et al. | |
| 6,592,900 B1 | 7/2003 | Buhler et al. | |
| 6,677,417 B2 * | 1/2004 | Meffert et al. | 526/264 |
| 6,900,165 B2 | 5/2005 | Meffert et al. | |
| 7,786,233 B2 | 8/2010 | Okamura | |
| 2001/0010825 A1 | 8/2001 | Shimizu et al. | |
| 2008/0139724 A1 * | 6/2008 | Kolter et al. | 524/421 |
| 2008/0181962 A1 | 7/2008 | Brzeczko et al. | |
| 2011/0158929 A1 | 6/2011 | Kim et al. | |
| 2011/0220534 A1 | 9/2011 | Fussnegger et al. | |
| 2011/0257339 A1 | 10/2011 | Fischer et al. | |

FOREIGN PATENT DOCUMENTS

| | | |
|---|---|---|
| DE | 19547761 A1 | 6/1997 |
| DE | 10019470 A1 | 11/2000 |
| DE | 102005005974 A1 | 8/2006 |
| DE | 202009000692 U1 | 4/2009 |
| EP | 88964 A2 | 9/1983 |
| EP | 438713 A2 | 7/1991 |
| EP | 873130 A2 | 10/1998 |
| EP | 1 083 884 A1 | 3/2001 |
| EP | 1263813 A1 | 12/2002 |
| EP | 1950230 A1 | 7/2008 |
| GB | 836831 A | 6/1960 |
| WO | WO-01/68727 A1 | 9/2001 |
| WO | WO-2009/024457 A1 | 2/2009 |
| WO | WO-2010/072640 A1 | 7/2010 |
| WO | WO-2012-069975 | 5/2012 |

OTHER PUBLICATIONS

U.S. Appl. No. 61/416,311.
International Search Report dated Mar. 3, 2011, in European Application No. EP10192173.
Al-Malaika, S., "Antioxidants and Stabilizers," Polymeric Materials Encyclopedia, Ed. J.C. Salamone, vol. 1, 1996, pp. 314-327, CRC Press, Inc.
Encina, M.V., et al., "Ultrasonic Degradation of Polyvinylpyrrolidone: Effect of Peroxide Linkages," Journal of Polymer Science: Polymer Letters Edition (1980), vol. 18, pp. 757-760.
Haaf, F., et al., "Polymers of N-Vinylpyrrolidone: Synthesis, Characterization and Uses," Polymer Journal (1985), vol. 17, No. 1, pp. 143-152.
King III, R.E., "Antioxidants (Overview)," Polymeric Materials Encyclopedia, Joseph C. Salamone, Editor-in-Chief, vol. 1, A-B, CRC Press, Inc. (1996), pp. 306-313.
Kline, G.M., "Polyvinylpyrrolidone," Modern Plastics (Nov. 1945), pp. 157-218.
"N-Vinyl Amide Polymers," Encyclopedia of Polymer Science and Engineering, Second Edition, vol. 17, pp. 212-213, John Wiley & Sons, New York, (1990).
Peniche, C., et al., "Study of the Thermal Degradation of Poly(N-vinyl-2-pyrrolidone) by Thermogravimetry-FTIR," Journal of Applied Polymer Scient (1993), vol. 50, pp. 485-493.

* cited by examiner

*Primary Examiner* — Ling Choi
*Assistant Examiner* — David L Miller
(74) *Attorney, Agent, or Firm* — Novak Druce Connolly Bove + Quigg LLP

(57) ABSTRACT

Process for the preparation of low-peroxide crosslinked vinyllactam polymer by free-radical polymerization in the presence of at least one organic substance acting as antioxidant, low-peroxide crosslinked vinyllactam polymer obtainable by this process, and its use.

15 Claims, No Drawings

PROCESS FOR THE PREPARATION OF LOW-PEROXIDE CROSSLINKED VINYLLACTAM POLYMER

CROSS-REFERENCE TO RELATED APPLICATIONS

This application claims the benefit of U.S. Provisional Application 61/416,311, filed Nov. 23, 2010, which is incorporated by reference.

BACKGROUND OF THE INVENTION

The present invention relates to a process for the preparation of low-peroxide crosslinked vinyllactam polymer by free-radical polymerization in the presence of at least one organic substance acting as antioxidant, and also low-peroxide crosslinked vinyllactam polymer obtainable by this process and its use.

Many oxidation-sensitive polymers such as crosslinked and uncrosslinked homo- and copolymers of N-vinylpyrrolidone are usually converted to pourable powders following their polymerization by spray-drying or drum-drying or another warm-air drying. In these processes, as a result of the intensive air contact and the heat, traces of peroxides are formed, the content of which increases still further in the course of the subsequent packaging, storage and handling. This tendency towards peroxide formation can present problems when using polymers such as polyvinylpyrrolidone (PVP and PVPP) in pharmaceutical preparations. In the current pharmacopeia, e.g. Ph. Eur. 6 and JP XIV, the peroxide content for these polymers is limited to a maximum of 400 ppm. Through drying with the exclusion of air, storage at low temperatures and/or the hermetically sealed packaging under vacuum or an inert gas, the kinetics of peroxide formation can indeed be slowed, but not prevented. In addition, these processes are associated with a very high expenditure, meaning that the acceptance of such measures by the user is low. Moreover, it is the wish of pharmaceutical manufacturers to obtain polymers with even lower peroxide quantities, for example not more than 100 or even not more than 50 ppm, it being the intention then that these values are reliably not reached even in the event of the longest possible storage period.

Bühler writes in his book "Polyvinylpyrrolidone—Excipients for Pharmaceuticals", Springer, 2005, pages 33 and 34, that all types of povidones and crospovidones ("povidone" is the generic name for the soluble polyvinylpyrrolidone (PVP) in the pharmaceutical sector; "crospovidone" is the generic name for water-insolubly crosslinked PVP, which is also referred to as PVPP and polyvinylpyrrolidone-popcorn polymer) have a measurable growth in the peroxide content upon storage in the presence of atmospheric oxygen. This growth is reportedly particularly severe for the povidone with K value 90. Consequently, it is advisable to store products with these K values at low temperatures and/or hermetically sealed into aluminum-polyethylene double-layered film bags under a nitrogen atmosphere. Nevertheless, according to Bühler, the further increase in peroxide contents can only be slowed, but not stopped, thereby.

Moreover, such aluminum-polyethylene multi-layered film bags are very expensive, and the aluminum layer can be easily damaged, as a result of which they largely lose the protective effect against the penetration of oxygen.

Bühler also reports on the color change in aqueous solutions of PVP, especially after storage or heating, for example during sterilization: the resulting yellow to brown-yellow coloration results from the oxidation by means of atmospheric oxygen. According to Bühler, this can be avoided by adding suitable antioxidants to the polymer (after its polymerization). Bühler names cysteine and sodium sulfite as such antioxidants.

However, a disadvantage of adding such antioxidants is that the peroxides originating from the polymerization and also forming directly afterwards consume a larger amount of the antioxidants even upon their addition to the polymer and thus reduce the protection and the storage time. To compensate, relatively large amounts of antioxidant therefore have to be used.

The oxidation sensitivity of polymers such as PVP, the macroscopically visible and measurable effects of the oxidation and also proposed measures for containing and inhibiting the oxidation has been described in many publications (see for example Bühler in the publication detailed above; Kline in Modern Plastics, 1945, November, from page 157 onwards; Peniche et al. in Journal of Applied Polymer Science Vol. 50, pages 485-493, 1993; EP-B 873 130; U.S. Pat. No. 6,331,333; Encina et al. in the Journal of Polymer Science: Polymer Letters Edition, Vol. 18, pages 757 to 760).

Like this, U.S. Pat. No. 6,498,231 B2 describes the addition of antioxidants to the ready prepared polymer.

EP 1263813 B1 discloses a process for popcorn polymerization with adjustment of the particle size of the popcorn polymers by means of passing through a stream of inert gas and/or adding reducing agents. In this case, a reducing agent can optionally be added in amounts of from 0.1 to 1% by weight, based on the monomer mixture, for achieving full freedom from oxygen in the reaction mixture. The reducing agents described are sodium sulfite, sodium pyrosulfite, sodium dithionite, ascorbic acid or mixtures of the reducing agents. In the examples, sodium dithionite was used in an amount of 2.2*(10 to the power of −7) to 1.9% by weight, based on the monomer mixture.

A reduction in peroxide content or a stabilization against peroxide build-up is neither specified as the aim nor otherwise mentioned as such in the entire specification.

A process for stabilizing PVP by means of adding hydrazine and derivatives thereof is known from U.S. Pat. No. 2,821,519.

However, hydrazines are toxicologically unacceptable and undesired in N-vinylpyrrolidone homo- and copolymers and polymers of N-vinylpyrrolidone derivatives.

EP-B 1 083 884 describes a process for stabilizing polyvinylpyrrolidones against peroxide formation, in which aqueous solutions of the polymers are admixed with very small amounts of heavy metal salts or with peroxide-cleaving enzymes. These remain in the product. Suitable heavy metals are manganese, zinc, cobalt and in particular copper.

However, the use of the proposed heavy metals is disadvantageous on account of possible accumulation in the body. Moreover, the use of enzymes is disadvantageous for reasons of cost and stability.

GB 836,831 discloses a process for stabilizing polyvinylpyrrolidones against discolorations, in which solutions of the polymers are treated with sulfur dioxide, sulfurous acid or alkali metal sulfites.

It is known from DE-A 10 2005 005 974 that in the process known from GB 836,831, the peroxide build-up occurs after storage to an even greater extent than in the case of untreated polymers. DE-A 10 2005 005 974 therefore discloses a process in which the polyvinylpyrrolidones are treated firstly with sulfur dioxide, sulfurous acid or alkali metal salts thereof and then with a free-radical scavenger.

However, this process does not lead to the desired long-lasting effects with all polymers. For example, color and odor and peroxide content are not always satisfactory in the long term.

WO 2010/072640 discloses a process for the preparation of low-peroxide polymer comprising the treatment of the polymer with elemental metal in the presence of a liquid, and also a polymer obtainable by the process according to the invention with a peroxide content of less than 20 ppm based on the polymer solids content, where the peroxide content is determined two days after treatment by means of iodometry in accordance with Ph.Eur. 6, and the polymer has not more than 5 ppm, based on the polymer solids content, of any precious metal and not more than 1000 ppm, based on the polymer solids content, of any nonprecious metal.

Alkali metals which dissolve in the polymer solution or suspension with the formation of hydrogen are used, or precious metals and gaseous hydrogen which is passed over these precious metals. The hydrogen here is intended to reduce the peroxides.

The use of gaseous hydrogen and/or hydrogen-forming metals that are reactive with water is a safety risk which should not be underestimated in an industrial plant and therefore signifies higher costs.

Antioxidants are sufficiently known to the skilled person in all areas of polymer chemistry. Usually, therefore, antioxidants are added to oxidation-sensitive substances in order to protect these against further oxidation, possibly by atmospheric oxygen (see for example R. E. King III. "Antioxidants (Overview)" and S. Al-Malaika "Antioxidants and Stabilizers" in Polymeric Materials Encyclopedia, Volume 1, Ed. J. C. Salamone, 1996).

Such a procedure is described for example in DE10019470 for stabilizing polyvinylpyrrolidones. In this, antioxidants are added and mixed in after the polymerization or a post-treatment following the polymerization and before optionally drying to give polymer powders. The amounts required for this are given as 0.00001 to 30% by weight, based on the polymer solids content. Specifically mentioned amounts used in the examples are 0.1% by weight of hydroquinone and also 0.5 and 1% by weight of another antioxidant, in each case based on the polymer solids content.

It is common to this process and to all examples that the antioxidant is added in each case to a solution of a finished polymer, i.e. after the end of the polymerization or after a possible post-treatment of the polymer.

A disadvantage of the specified and specifically used substances from DE10019470 is that most of them are either not pharmaceutically suitable or are pharmaceutically suitable only to a very limited extent. Moreover, quite a few cause a sulfur odor or even react with customary drug active ingredients.

These substances likewise do not achieve an adequate reduction in peroxide content. In particular, no lowering, or only an inadequate lowering, of the peroxide values can be achieved with crosslinked, water-insoluble polymers.

U.S. Pat. No. 7,786,233 B2 discloses a polyvinylpyrrolidone composition with defined properties. In this connection, in order to achieve higher product stability, an antioxidant is added during heating before, during or after the pH adjustment, which is carried out following the acidic hydrolysis, which, for its part, is carried out when the polymerization and post-polymerization is complete. Peroxide contents were not determined. Crosslinked polymers such as, in particular, popcorn polymers and copolymers of vinylpyrrolidone, like other vinyllactam polymers as well, are not mentioned.

According to all of the procedures known to the skilled person, accordingly, antioxidants are added to the substance to be protected, for example a polymer, only after it has been prepared. According to the prior art publications, the addition thus takes place at a time at which the polymerization and the possible post-polymerization and post-treatment have been concluded. At this time, therefore, no unpolymerized monomers, or only very small residual contents, usually significantly less than 5% by weight, based on the total amount of monomers used, are present, If solid polymer is desired, then the addition of the antioxidant according to the prior art takes place in most cases directly before the drying.

U.S. Pat. No. 7,786,233 B2 already discloses, as the single known publication, the addition of antioxidant before, during or after the polymerization. However, the specification does not say any more about the action regarding "before" and "during" and also does not disclose any examples in this regard.

The organic substance acting as antioxidant within the context of this invention serves, according to the prior art, to protect oxidation-sensitive substances against oxidation. It therefore reacts with oxygen and other radicals and forms reaction products. In this process, the antioxidant is "consumed" as a result of the reaction with the radicals, as a result of which the amount of unconsumed antioxidant is continuously reduced further and therefore the protection against oxidation is also reduced.

DETAILED DESCRIPTION OF THE INVENTION

On the basis of this information in the prior art and the experience of a skilled person, it was expected that the organic substance acting as antioxidant and used within the context of this invention would interfere with the free-radical polymerization: thus, for example, even at the start of the free-radical polymerization, the antioxidant should react with the radicals present therein which bring about the polymerization. As a result, however, the free-radical polymerization would be disturbed and the protective effect due to the antioxidant would be reduced. Undesired secondary components would also be formed as a result of the radicals reacting with antioxidant.

It was an object of the present invention to find an improved process for stabilizing crosslinked polymers against peroxide formation which produces products which have low to no peroxide contents. Moreover, the peroxide contents thereof should not increase, or increase only slightly, even upon storage in an oxygen-containing environment such as air, and should not exceed a certain value within a certain time. This stabilization should be achieved without, however, contaminating the products with substances which are prohibitive even in small amounts especially for pharmaceutical and food applications. Likewise, the hazard potential of reactive metals and gaseous hydrogen as feed substances should be avoided during the production.

It was a further aim that the polymers obtained should be suitable for contact with the human and/or animal body and its fluids. In particular, the polymers obtained should be pharmaceutically suitable to as unlimited a degree as possible, including oral or intravenous administration into the human and/or animal body. Likewise, contact with foods or plants which serve for nutrition or come into contact directly or in processed form with animals and/or humans, for example as foods or animal feed, should be possible without restrictions.

Accordingly, a process for the preparation of low-peroxide crosslinked vinyllactam polymer by free-radical polymerization in the presence of at least one organic substance acting as antioxidant has been found.

In particular, a process for the preparation of low-peroxide water-insolubly crosslinked vinyllactam polymer by free-radical polymerization in the presence of at least one organic substance acting as antioxidant has been found.

In particular, a process for the preparation of low-peroxide water-insolubly crosslinked polyvinylpyrrolidone by proliferous polymerization in the presence of at least one organic substance acting as antioxidant has been found.

Furthermore, a low-peroxide crosslinked vinyllactam polymer, preferably a water-insolubly crosslinked vinyllactam polymer and particularly preferably water-insolubly crosslinked polyvinylpyrrolidone, obtainable by the found process has been found.

The vinyllactam polymers obtainable thereby comprise antioxidant which was already present during the free-radical polymerization. A preferred antioxidant is selected from the group of tocopherols. The resulting vinyllactam polymers here in each case have, based on the polymer solids content, a peroxide content determined two days after preparation of not more than 50 ppm, preferably not more than 20 ppm and particularly preferably not more than 10 ppm and/or a peroxide content determined at any desired time within up to three months after preparation of not more than 100 ppm, preferably not more than 50 ppm, particularly preferably not more than 20 ppm and very particularly preferably not more than 10 ppm, such as, for example, not more than 1 ppm. The peroxide content here is determined by means of iodometry in accordance with Ph.Eur. 6. Furthermore, the vinyllactam polymer obtainable has residual monomer contents, for each of the monomers used, of not more than 100 ppm, preferably not more than 50 ppm, particularly preferably not more than 20 ppm, very particularly preferably not more than 10 ppm and in particular not more than 5 ppm, such as, for example, less than 1 ppm.

The use of low-peroxide crosslinked vinyllactam polymer obtainable by the process according to the invention or low-peroxide crosslinked vinyllactam polymer according to the invention as auxiliary or active ingredient in the field of cosmetics, pharmaceuticals, animal feed, animal health, crop protection, beverage technology, food technology, detergents and cleaners, medical technology or industrial applications has likewise been found. In particular, the use in pharmaceutical formulations has been found.

In principle, all vinyllactam homopolymers and copolymers can be prepared by means of the process according to the invention for the preparation of low-peroxide crosslinked vinyllactam polymer.

The term "polymer" comprises, for example, linear, water-solubly crosslinked or water-insolubly crosslinked polymers. The term "water-insolubly crosslinked polymer" also comprises the so-called popcorn polymers, which are referred to as "proliferous polymers" or, as in the case of polyvinylpyrrolidone, also as "PVPP". The preparation of such popcorn polymers takes place by the free-radical polymerization known as "popcorn polymerization" or "proliferous polymerization".

"Crosslinked" means polymer which, viewed from a statistical point of view, has at least one branching point per polymer chain. In this connection, despite its branching and irrespective of the number of branching points per polymer chain, a polymer may still be soluble in suitable solvents. "Crosslinked" means in particular a polymer which, on the basis of the number of branching points per polymer chain or its physical structure, is insoluble in all solvents.

Within the context of this invention, "water-insoluble" and "insoluble" means that the polymer has a solubility at 20° C. of less than 1 part of polymer in 100 parts of water or solvent.

"Polymer" comprises homopolymers, copolymers, graft homopolymers and graft copolymers which, in each case, may be present as solubly crosslinked or insolubly crosslinked, in particular water-solubly crosslinked or water-insolubly crosslinked polymers.

The low-peroxide crosslinked vinyllactam polymers preparable by the process according to the invention comprise, besides vinyllactam, also no, one or more monomers a), no, one or more monomers b) and also no, one or more crosslinking monomers c). This means the polymers have been obtained by polymerization of the specified monomers and can also comprise residual amounts of the monomers. Besides a vinyllactam homopolymer, vinyllactam polymer may also be a vinyllactam copolymer of two or more different vinyllactams.

Suitable vinyllactams are, for example:

N-vinyllactams such as N-vinylpyrrolidone ("NVP", "VP"), N-vinylpiperidone, N-vinylcaprolactam ("VCap"), derivatives thereof substituted with C1 to C8-alkyl groups, such as 3-methyl-, 4-methyl- or 5-methyl-N-vinylpyrrolidone.

Preferred vinyllactams are N-vinylpyrrolidone, 3-methyl-N-vinylpyrrolidone, 4-methyl-N-vinylpyrrolidone, 5-methyl-N-vinylpyrrolidone, N-vinylpiperidone and N-vinylcaprolactam. Very particularly preferred vinyllactams are N-vinylpyrrolidone and N-vinylcaprolactam.

Polymers according to the invention may be homopolymers of a vinyllactam and also copolymers of two or more vinyllactams.

A vinyllactam polymer may therefore be a homopolymer or copolymer comprising N-vinyllactams such as N-vinylpyrrolidone (VP) or derivatives thereof methyl-substituted in the 3, 4 or 5 position, N-vinylpiperidone or N-vinylcaprolactam (VCap).

A preferred vinyllactam is N-vinylpyrrolidone, N-vinylcaprolactam or mixture thereof. Particular preference is given to N-vinylpyrrolidone.

Preferred vinyllactam polymers are vinylpyrrolidone polymers (polyvinylpyrrolidones), vinylpyrrolidone copolymers and vinylpyrrolidone-popcorn polymers.

Suitable monomers a) are, for example:

N-vinylamides such as N-vinylformamide and the N-vinylamine thereof obtainable following polymerization by hydrolysis, N-vinyl-N-methylacetamide.

Amines such as N-vinyl- or allyl-substituted heterocyclic compounds, preferably N-vinylpyridine, or N-allylpyridine, N-vinylimidazoles, which may also be substituted in the 2, 4 or 5 position with C1-C4-alkyl, in particular methyl or phenyl radicals, such as 1-vinylimidazole, 1-vinyl-2-methylvinylimidazole, and quaternized analogs thereof, such as 3-methyl-1-vinylimidazolium chloride, 3-methyl-1-vinylimidazolium methylsulfate, N—C1- to C24-alkyl-substituted diallylamines or quaternized analogs thereof, such as diallylammonium chloride or diallyldimethylammonium chloride.

Preferred monomers a) are vinylamides such as vinylformamide, and also the vinylamine obtainable by hydrolysis following polymerization, N-vinylimidazole, 1-vinyl-3-methylimidazolium-chloride, 1-vinyl-3-methylimidazoliumsulfate, and vinylmethylamide.

Very particularly preferred monomers a) are vinylformamide and also the vinylamine obtainable by hydrolysis after the polymerization, and N-vinylimidazole.

Polymers according to the invention may be homopolymers of vinyllactam, and also copolymers of one or more vinyllactams, and copolymers of at least one vinyllactam and at least one monomer a), for example copolymers of N-vinylpyrrolidone and N-vinylimidazole, copolymers of N-vinylpyrrolidone and N-vinylformamide or copolymers of N-vinylpyrrolidone and N-vinylcaprolactam.

Suitable monomers b) are all monomers referred to in WO 2010/072640 from page 6, line 8 to page 8, line 17 as monomers b), to which reference is expressly made here.

Preferred monomers b) are maleic acid, maleic anhydride, isopropylmethacrylamide, acrylamide, methacrylamide, 2-hydroxyethyl(meth)acrylamide and 2-hydroxyethylethylacrylamide, also vinyl esters of aliphatic C2-C18-carboxylic acids, such as vinyl acetate, and also the vinyl alcohol obtainable therefrom by hydrolysis after the polymerization, vinyl propionate, vinyl butyrate, vinyl laurate, vinyl stearate, vinyl neodecanoate VEOVA 9 and VEOVA 10, also dimethylamino(m)ethyl (meth)acrylate and dimethylamino(m)ethyl(meth)acrylamide and quaternized analogs thereof, and also diallyldimethylammonium chloride.

Very particularly preferred monomers b) are methacrylamide, vinyl acetate, and also the vinyl alcohol obtainable by hydrolysis after the polymerization, vinyl propionate, vinyl neodecanoate VEOVA 9 and VEOVA 10, dimethylaminoethyl (meth)acrylate, dimethylaminoethyl(meth)acrylamide and quaternized analogs thereof, and also diallyldimethylammonium chloride.

In particular, preference is given to vinyl acetate and vinyl alcohol monomers b).

Polymers which are copolymers and comprise monomers b) can comprise one or more of the monomers b). Usually, however, not more than five different monomers b) are present in one copolymer.

Preferred polymers further include copolymers which comprise at least one vinyllactam, at least one monomer a) and at least one monomer b).

Polymers according to the invention can be, for example, copolymers of N-vinylpyrrolidone and vinyl acetate, copolymers of N-vinylpyrrolidone, vinylcaprolactam and vinyl acetate or copolymers of N-vinylcaprolactam and vinyl acetate.

Suitable crosslinking monomers c) ("crosslinkers") are, for example, those described in WO2009/024457 on page 7, line 1 to page 9, line 2, to which reference is expressly made here.

Preferred crosslinking monomers c) are pentaerythritol triallyl ether, methylene bisacrylamide, N,N'-divinylethylene urea, N,N'-divinylpropylene urea, divinylbenzene, ethylidene bis-3-(N-vinylpyrrolidone), 1-vinyl-3-ethylidene pyrrolidone, 3-vinyl-N-vinylpyrrolidone, 4-vinyl-N-vinylpyrrolidone, 5-vinyl-N-vinylpyrrolidone, allyl (meth)acrylate, triallylamine, acrylic acid esters of glycol, butanediol, trimethylolpropane and glycerol, acrylic acid esters of glycol, butanediol, trimethylolpropane or glycerol reacted with ethylene oxide and/or epichlorohydrin, and mixtures of the aforementioned substances.

Crosslinking monomers c) preferred for the use for the so-called popcorn polymerization (proliferous polymerization) are N,N'-divinylethylene urea, ethylidene bis-3-(N-vinylpyrrolidone), 1-vinyl-3-ethylidene pyrrolidone, 3-vinyl-N-vinylpyrrolidone, 4-vinyl-N-vinylpyrrolidone, 5-vinyl-N-vinylpyrrolidone, and mixtures of the aforementioned substances, of which very particular preference is given to N,N'-divinylethylene urea.

The quantitative fractions in percent by weight based on the total mass of the polymer are here for vinyllactams usually at least 20% by weight, preferably at least 30% by weight, particularly preferably at least 50% by weight, very particularly preferably at least 60% by weight and in particular up to 99.999% by weight, such as, for example, homopolymers of 100% of a vinyllactam and 0.001% by weight of monomer c).

The quantitative fractions in percent by weight based on the total mass of the polymer are here for the monomers a) usually up to 80% by weight, preferably up to 70% by weight, particularly preferably up to 50% by weight, very particularly preferably up to 40% by weight and in particular up to 20% by weight and are, for example, not present at all in the polymer.

The quantitative fractions in percent by weight based on the total mass of the polymer are here for monomers b) usually up to 80% by weight, preferably up to 70% by weight, particularly preferably up to 50% by weight, very particularly preferably up to 40% by weight and in particular less than 5% by weight and are for example not present at all in the polymer.

If the polymer is water-solubly crosslinked polymer, the quantitative fractions of the crosslinking monomers c) in percent by weight based on the total mass of the polymer are usually 0.001 to 20% by weight, preferably 0.01 to 10% by weight, particularly preferably 0.05 to 5% by weight and very particularly preferably 0.1 to 1% by weight.

If the polymer is water-insolubly crosslinked polymer, such as, for example, a popcorn polymer, the quantitative fractions of the crosslinking monomers c) in percent by weight based on the total mass of the polymer are usually 0.001 to 10% by weight, preferably 0.01 to 5% by weight, particularly preferably 0.1 to 4% by weight and very particularly preferably 0.5 to 2.5% by weight, such as, for example, 1.4 to 2.3% by weight.

The total amounts of vinyllactam, monomer a), monomer b) and monomer c) always add up here to 100% by weight based on the polymer.

Thus, for example, a typical popcorn polymer comprises vinyllactam, for instance in the case of a preferred water-insolubly crosslinked polyvinylpyrrolidone, only vinylpyrrolidone, in the quantitative fraction from 95 to 99.8% by weight, preferably 97.5 to 99.5% by weight, and also a crosslinking monomer c) in the quantitative fraction from 0.2 to 5% by weight, preferably 0.5 to 2.5% by weight, for example 98.1% by weight vinyllactam and 1.9% by weight monomer c), where, in the case of water-insolubly crosslinked polyvinylpyrrolidone, N,N'-divinylethyleneurea is particularly preferred.

The vinyllactams, monomers a), b) and c) used for the polymerization, can be, independently of one another, a single or mixtures of two or more vinyllactams, monomers a), monomers b) and/or monomers c), where the combined quantitative fraction of the vinyllactams, monomers a), b) or c) gives the quantitative fraction specified in each case for vinyllactam, monomer a), for monomer b) and for monomer c), respectively, in the polymer.

Crosslinked polyvinylpyrrolidones are, for example, polymers with K values from 10 to 200, preferably K15 to K150, for example 15, 17, 25, 30, 60, 85, 90, 95, 100, 115 or K120.

The K value is a measure of the molar mass and is determined via the solution viscosity of an aqueous solution with defined polymer concentration (see Volker Bühler in "polyvinylpyrrolidone excipients for the pharmaceutical industry", 9th revised edition, BASF, page 26 to 29). It can only be determined for polymers which have adequate solubility in water.

Crosslinked vinylpyrrolidone copolymers are, for example, copolymers with N-vinylcaprolactam (Vcap), vinyl acetate (VAc), N-vinylimidazole (VI) or mixtures thereof, such as copolymers of N-vinylpyrrolidone (VP) and vinyl acetate having a VP/VAc weight ratio of from 20:80 to 80:20, for example 30:70, 50:50, 60:40, 70:30, with K values of from 10 to 150, preferably from 15 to 80 and particularly preferably from 20 to 50. Particularly preferred copolymers of N-vinylpyrrolidone and vinyl acetate have a K value of from 25 to 60 and a VP to VAc weight ratio of from 55:45 to 70:30, such as, for example, 60:40, 50:50 and 65:35, and also crosslinked copolymers of VP and VI, and copolymers of VP and VCap in each case with K values of from 15 to 150, preferably from 20 to 100 and in particular from 30 to 90, and also weight ratios of the monomes VP to VI or VP to VCap of from 80:20 to 20:80, preferably from 70:30 to 30:70, particularly preferably from 60:40 to 40:60 and for example also 50:50.

The preparation of vinyllactam polymers by free-radical polymerization including using crosslinking monomers is known per se. The polymerization here produces crosslinked polymers which, depending on the number of crosslinking points and/or the physical structure (the arrangement of the polymer chains three-dimensionally), are water-soluble, gel-forming in water or insoluble in water.

The preparation of polyvinylpyrrolidones can take place for example as solution polymerization or precipitation polymerization in a suitable solvent such as water, mixtures of water and organic solvents, for example ethanol/water or isopropanol/water mixtures or in purely organic solvents such as methanol, ethanol or isopropanol. These preparation methods are known to the skilled person.

Preferred water-insolubly crosslinked polymers are polymers of vinylpyrrolidone or of vinylpyrrolidone with vinylimidazole, vinylcaprolactam and/or vinyl acetate which have been prepared by means of the so-called "popcorn" polymerization (also referred to as proliferous polymerization), for which reason the polymers are also referred to as "proliferous polymer". Water-insolubly crosslinked N-vinylpyrrolidone homopolymers are also referred to as "PVPP" or—in the pharmaceutical sector—as "crospovidone".

Popcorn polymerization and popcorn polymers are described for example by Barabas in Encyclopedia of Polymer Science and Engineering, Second Edition, Volume 17, 1989, page 212, 3rd paragraph to page 213, 3rd paragraph, or Haaf, Sanner and Straub, Polymer Journal 1985, Vol. 17, No. 1, pages 143 to 152; especially on pages 148 to 151.

The crosslinkers used for preparing popcorn polymers are formed in situ by a reaction step prior to the actual polymerization reaction or are added as a defined compound (see Haaf et al.). In the case of such popcorn polymers, accordingly, a determination of the molar mass is not possible because popcorn polymers are virtually insoluble in all solvents. All customary methods, however, are based on an at least slight solubility of the polymers and are therefore unsuitable for popcorn polymers.

The preparation of popcorn polymers contemplated according to the invention, such as, in particular, water-insolubly crosslinked polyvinylpyrrolidone (PVPP) with the addition of crosslinkers is described for example also in EP-A 88964, EP-A 438 713 or WO 2001/068727.

The preparation of popcorn polymers such as PVPP by generating crosslinkers in situ in a step prior to the actual popcorn polymerization and their polymerization with the specified monomers to yield crosslinked, water-insoluble popcorn polymers is known, for example, also from U.S. Pat. No. 3,277,066 or U.S. Pat. No. 5,286,826. Preferably, such a generation of the crosslinker from the monomer takes place here in the presence of a strong base.

Both preparation variants are suitable for the present invention and are therefore embodiments according to the invention.

Preferably, the preparation according to the present invention, however, takes place by the first-mentioned method with the addition of crosslinkers.

Preferred popcorn polymers are obtained from in situ prepared crosslinker and N-vinylpyrrolidone, N-vinylimidazole, N-vinylcaprolactam and/or N-vinyl acetate.

Particularly preferred popcorn polymers are obtained using divinylethylene urea as crosslinking monomers c) and N-vinylpyrrolidone and/or N-vinylcaprolactam as vinyllactams, and optionally N-vinylimidazole and/or N-vinyl acetate as monomers a).

The quantitative ratios VP to VI here are 0.5:9.5 up to 5:5, preferably 1:9. The quantitative fractions of the crosslinker in the entire monomers are here in each case 0.5 to 3% by weight, preferably 1.4 to 2.3% by weight and very particularly preferably 1.9 to 2.1% by weight.

Particularly preferred popcorn polymers are obtained from N,N'-divinylethylene urea and N-vinylpyrrolidone.

The quantitative fractions of the crosslinker in the entire monomers are here in each case 0.5 to 3% by weight, preferably 1.4 to 2.3% by weight and very particularly preferably 1.9 to 2.1% by weight.

Water-insolubly crosslinked polymers (popcorn polymers) are also commercially available, for example as Kollidon® CL, Kollidon® CL-F or Kollidon® CL-SF, and, as micronized product, Kollidon® CL-M from BASF SE, or as Polyplasdone® XL, Polyplasdone® XL-10, Polyplasdone® INF-10, Polyplasdone® Ultra or Polyplasdone® Ultra-10 from ISP Corp., USA. Further known trade names are Divergan® and Polyclar®.

Popcorn polymers which comprise N-vinylpyrrolidone and N-vinylimidazole in the weight ratio 1:9 are also commercially available for example as Divergan® HM from BASF SE.

The polymers are obtained by the polymerization of the stated monomers and can therefore also comprise residual amounts of these monomers. Customary residual amounts are for example not more than 100 ppm of one or all monomers based on the polymer solids content. Consequently, crosslinked vinylpyrrolidone polymers in particular are obtainable by the process according to the invention. Preferably, crosslinked polyvinylpyrrolidones, and very particularly preferably water-insolubly crosslinked polyvinylpyrrolidones, are obtainable which comprise not more than 100 ppm, preferably not more than 50 ppm, particularly preferably not more than 10 ppm, very particularly preferably not more than 5 ppm and in particular not more than 1 ppm, of N-vinylpyrrolidone or residual monomer, depending on the monomer used, based on the polymer solids content.

If these residual amounts are not obtained directly by the polymerization, suitable measures are known to the skilled person for lowering the monomer contents. Methods that are customary and can be used for the polymers are, for example, thermal distillation, steam distillation, stripping, adsorption and, in the case of water-insolubly crosslinked polymers such as popcorn polymers, also, for instance, washing.

Preferably, the polymers are obtained without the use of such measures. In the case of popcorn polymers, preferably only washing takes place.

Within the context of this invention, of all of the aforementioned vinyllactam polymers, very particular preference is given to water-insolubly crosslinked vinyllactam polymers and very particular preference is given to water-insolubly crosslinked polyvinylpyrrolidone polymers such as polyvinylpyrrolidone popcorn polymers.

Polymers that are particularly preferred according to the present invention are accordingly water-insolubly crosslinked, low-peroxide vinyllactam polymers of 0.5 to 2.5% by weight of N,N'-divinylethylene urea and 97.5 to 99.5% by weight of N-vinylpyrrolidone which—in each case based on the polymer solids content—have a peroxide content determined two days after preparation of not more than 50 ppm, preferably not more than 20 ppm and particularly preferably not more than 10 ppm and/or a peroxide content determined at any desired time within up to three months following preparation of not more than 100 ppm, preferably not more than 50 ppm and particularly preferably of not more than 20 ppm, such as, for example, less than 10 ppm or even less than 5 ppm. The peroxide content here is determined by means of iodometry in accordance with Ph.Eur. 6. These vinyllactam polymers, based on the polymer solids content—likewise have residual monomer contents, for each of the monomers used, of not more than 100 ppm, preferably not more than 50 ppm, particularly preferably not more than 20 ppm, very particularly preferably not more than 10 ppm and in particular not more than 5 ppm, such as, for example, less than 1 ppm.

The process according to the invention for the preparation of low-peroxide crosslinked vinyllactam polymer takes place by the known processes by means of free-radical polymerization, but where the polymerization is carried out in the presence of at least one organic substance acting as antioxidant.

The organic substance acting according to the invention as antioxidant (within the context of this invention, also referred to as "antioxidant") is therefore added before or during the polymerization with the reactants (monomers, optionally crosslinker, initiators etc.) or directly to the reaction mixture. "During the polymerization" means here that at least more than 10% by weight, preferably more than 20% by weight, particularly preferably more than 30% by weight and very particularly preferably more than 50% by weight, of the monomers are still not polymerized.

Within the context of this invention, the term "organic substance acting as antioxidant" ("antioxidant") means one or mixtures of two or more of the compounds known to the skilled person as such substances: such substances are known to the skilled person for example from Polymeric Materials Encyclopedia (see above), from DE10019470 or DE-A 10 2005 005 974 and WO 2010/072640.

This antioxidant used according to the invention is therefore familiar as such to the skilled person. Suitable antioxidants have a redox potential and can react with free radicals.

Organic substance acting as antioxidant used according to the invention is one or more substances selected from phenolic, bisphenolic, nitrogen-containing, phosphorus-containing, sulfur-containing, alcoholic, aminic and hindered aminic compounds known as antioxidant to the skilled person. Encompassed by the present invention are also all substances specified as antioxidants in U.S. Pat. No. 6,498,231 B2 (column 4, line 36 to column 6, line 29), to which reference is expressly made here.

The organic substance acting as antioxidant is preferably selected here from phenolic, bisphenolic, nitrogen-containing, sulfur-containing and alcoholic organic substances acting as antioxidant. Such substances are particularly preferably selected from the group comprising tocopherols, catechin hydrate, uric aid, nordihydroguaiaretic acid, propyl 3,4,5-trihydroxybenzoate, 4-hydroxy-2,2,6,6-tetramethylpiperidin-1-oxyl, tris(tetramethylhydroxypiperidinol) citrate, N-acetylcysteine, bis(2,2,6,6-tetramethylpiperidin-1-oxyl-4-yl)decanedioate, 2,6-di-tert-butyl-4-methylphenol, 1,2-dithiolane-3-pentanoic acid and salts of ascorbic acid and/or of isoascorbic acid, such as sodium ascorbate.

Within the context of this invention, the term "tocopherol" and "tocopherols"—unless only the individual substance "tocopherol" is clearly intended—is used for a group of substances consisting of tocopherol, structural isomers of tocopherol such as alpha-, beta-, gamma- and delta-tocopherol, isomers of tocopherols, individual substances, acting as antioxidant, of the ingredients occurring in vitamin E such as the tocomonoenols and the tocotrienols and isomers thereof, vitamin E from natural or synthetic production, fractions of vitamin E, and derivatives of the aforementioned substances such as esters, amides and ethers, for example tocopherol acetate and esters with fatty acids, and also mixtures of more than one of these substances used according to the invention.

"Fractions" means a selection of substances from the overall mixture "vitamin E" which has been obtained for instance by customary separation methods, for example fractionation by means of precipitation, separating columns and the like.

According to known knowledge, vitamin E is a mixture which comprises tocopherol and/or isomers thereof: vitamin E is a collective term for a group of fat-soluble substances with antioxidative and non-antioxidative effects. Vitamin E forms are known as tocopherols, tocotrienols, tocomonoenols and MDT ("marine derived tocopherols"). Each of these substances is available as eight different stereoisomers. The term "vitamin E" is often used incorrectly just for alpha-tocopherol.

Alpha-tocopheryl acetate (vitamin E acetate) is a synthetic vitamin E derivative and is likewise obtainable in eight stereoisomers. Commercially available alpha-tocopheryl acetate is a mixture of these isomers which in most cases is referred to as "all rac-alpha-tocopheryl acetate" or formally also as "DL-alpha-tocopheryl acetate". Moreover, three further derivatives (beta, gamma and delta) also exist in eight stereoisomers in each case.

The amount of tocopherols used according to the invention can here be between 0.01 and 3% by weight. Preferably, up to 2.5% by weight, particularly preferably up to 2% by weight, very particularly preferably up to 1.25% by weight and in particular up to 0.75% by weight are used, in each case based on the polymer solids content. At least preferably 0.025% by weight are used, particularly preferably at least 0.05% by weight, very particularly preferably at least 0.1% by weight and in particular at least 0.25% by weight, in each case based on the polymer solids content.

The amount of organic substance acting as antioxidant and not comprising tocopherols used according to the invention can be between 0.01 and 2% by weight. It is preferably used up to 1.5% by weight, particularly preferably up to 1% by weight, very particularly preferably up to 0.8% by weight and in particular up to 0.6% by weight, in each case based on the polymer solids content. At least preferably 0.05% by weight are used, particularly preferably at least 0.1% by weight, very particularly preferably at least 0.2% by weight and in particular at least 0.4% by weight, in each case based on the polymer solids content.

The amount of antioxidant used refers here in each case to the antioxidatively effective fraction of substance, if the substances, as in the case of vitamin E, can also comprise non-antioxidatively effective fractions.

Which fractions of substances are antioxidatively effective here and which are not is known to the skilled person. He can therefore easily establish what amount of antioxidant has to be used so that the antioxidatively effective fraction corresponds to the amounts according to the invention.

The substances, not comprising the tocopherols, are used preferably in amounts of b1) 0.05 to 0.5% by weight, preferably 0.075 to 0.25% by weight, such as, for example, 0.1% by weight of catechin hydrate, uric acid, nordihydroguaiaretic acid, propyl 3,4,5-trihydroxybenzoate, 4-hydroxy-2,2,6,6-tetramethylpiperidin-1-oxyl and/or tris(tetramethylhydroxypiperidinol) citrate, b2) 0.05 to 1% by weight, preferably 0.075 to 0.75% by weight, such as, for example, 0.1 to 0.5% by weight of N-acetylcysteine and/or bis(2,2,6,6-tetramethylpiperidin-1-oxyl-4-yl)decanedioate, b3) 0.1 to 2% by weight, preferably 0.25 to 1.5% by weight, such as, for example, 0.5 to 1% by weight of 2,6-di-tert-butyl-4-methylphenol, b4) 0.1 to 1% by weight, preferably 0.25 to 0.75% by weight, such as, for example, 0.5% by weight of 1,2-dithiolane-3-pentanoic acid, and/or b5) 0.05 to 2% by weight, preferably 0.075 to 1.5% by weight, such as, for example, 0.1 to 1% by weight of salts of ascorbic acid or of isoascorbic acid, such as in particular sodium ascorbate, in each case based on the content of polymerizable monomer.

The substances are preferably selected from tocopherols, subgroup b2) and/or b5). Within subgroup b2), particular preference is given to N-acetylcysteine. From subgroup b5), preference is given to metal salts of ascorbic acid or of isoascorbic acid. Particular preference is given to sodium ascorbate.

The organic substance acting as antioxidant that is used is particularly preferably one or more substances selected from the tocopherols.

Very particular preference is given to tocopherol, in particular alpha-tocopherol and also mixtures comprising these, such as vitamin E and vitamin E acetate.

The process for the preparation of low-peroxide crosslinked vinyllactam polymers takes place by customary preparation methods, usually in water, organic solvent or mixtures thereof, but can also be carried out in the absence of solvents as bulk polymerization.

Typical representatives of the organic solvents are, for example, C1- to C8-alcohols, such as methanol, ethanol, n-propanol, isopropanol, butanol, glycol, glycerol, diethyl ether. Preference is given to using methanol, ethanol and/or isopropanol.

Water may be water of varying quality: water of technical-grade quality, water of naturally occurring quality such as surface water, river water or groundwater, and also purified water. Purified ("pure") water can be purified by purification methods such as single or multiple distillation, demineralization, diffusion, adsorption, by means of ion exchangers and also activated carbons or other absorbents, by means of a filtration method such as ultrafiltration or dialysis. Purified water is the term usually used here to refer to singly or multiply distilled water and also completely demineralized water.

Preference is given to using organic solvents, water or mixtures thereof. Very particular preference is given to the use of predominantly water, in particular of purified water.

The preparation according to the invention takes place in the case of the soluble crosslinked polymers preferably in solution, in the case of water-soluble crosslinked polymers particularly preferably in aqueous solution. In the case of the insolubly crosslinked polymers, such as the polyvinylpyrrolidone popcorn polymers, the preparation takes place without a diluent or as precipitation polymerization. In the case of precipitation polymerization, starting from an aqueous solution or dispersion of the monomers, a polymer dispersion (in most cases a suspension) in water is obtained. Preferably, in the case of the water-insoluble crosslinked polyvinylpyrrolidone popcorn polymers, their preparation is by means of precipitation polymerization ("popcorn polymerization") in purified water.

Suitable reaction vessels are all vessels suitable for such reactions known to the skilled person, such as stirred reactors, tubular reactors, extruders, kneaders or fluidized-bed reactors. Preferably, the precipitation polymerization takes place in stirred reactors. The bulk polymerization preferably takes place in stirred reactors or kneaders.

Suitable preparation methods for the popcorn polymers according to the invention are described in particular in EP1263813 B1 (entire document) and DE 19547761 A1 (page 2, line 61 to page 3, line 29 and example 1a), to which reference is expressly made here.

Further suitable preparation instructions can be found in EP-A 88964, EP-A 438 713 or WO 2001/068727 and also U.S. Pat. No. 3,277,066 and U.S. Pat. No. 5,286,826.

Use of the process known from EP 1263813 B1 for popcorn polymerization with adjustment of the particle size of the popcorn polymers by means of a stream of inert gas and/or reducing agent, the process steps of which are described in paragraphs [0011], [0019] to [0025] and also the examples, is likewise possible and encompassed by the present invention.

If the process according to the invention is carried out analogously to the process described in EP 1263813 B1 with the addition of reducing agents for particle size adjustment, then the addition of organic substance acting as antioxidant takes place according to the present invention preferably prior to the addition of the reducing agent. However, it may also prove advantageous to only add antioxidant following the onset of the popcorn polymerization. Consequently, when using very pure feed materials, the start of the polymerization reaction can generally be speeded up. The onset of the popcorn polymerization is readily evident from the resulting heat of reaction and/or the visible formation of insoluble polymer particles.

Use of this polymerization process known from EP 1263813 B1 with particle size adjustment is a preferred embodiment of the present invention. Organic substance acting as antioxidant is added here to the monomers and with these to the reaction mixture or directly to the reaction mixture of the popcorn polymerization.

If crosslinker is generated in situ, as in U.S. Pat. No. 3,277,066 and U.S. Pat. No. 5,286,826, then the addition of antioxidant only takes place after the end of this generation phase and thus likewise directly before the start of the popcorn polymerization or following the onset of the popcorn polymerization.

The polymer solutions or dispersions prepared usually have a solids content of from 5 to 80% by weight, preferably 5 to 60% by weight. In the case of dispersions, the solids content is particularly preferably 5 to 25% by weight and in particular 8 to 15% by weight.

The polymerization may, but does not have to be, followed by a post-polymerization. For the post-polymerization, free-radical former (initiator) can be added. All initiators known to the skilled person are suitable in principle. For the post-polymerization in the case of a popcorn polymerization, preference is given to water-soluble azo initiators, the decomposition products of which are not prohibitive for the planned use of the polymer, i.e. for example do not cause clouding, odor or toxicity.

It is also possible, optionally also additionally after a post-polymerization, to carry out a chemical post-treatment such as an acidic or basic hydrolysis for reducing residual monomer. Furthermore, a physical post-treatment is possible, such as distillation, steam distillation or stripping.

Very particular preference is given to using those amounts of organic substance acting as antioxidant such that in the polymer following the preparation, only those amounts remain such that the total ash content (also called residue on ignition) and the maximum content amount of antioxidant (when using two or more substances as antioxidant, the respective content amount refers to each individual substance) satisfies the particular requirements according to the "relevant regulations".

Such "relevant regulations" governing the maximum ash contents and the content amount limits for certain substances for the respective polymers are known to the skilled person in the respective field of application. Regulations relevant in the pharmaceutical sector are, for example, the European Pharmacopeia (Ph.Eur.), the Japanese Pharmacopeia for Excipients (JPE), the US-American Pharmacopeia (USP) or the German Pharmacopeia (DAB) in their most current valid version in each case. Regulations relevant to the food sector are, for example, those issued by the Food and Drug Administration (FDA) in the USA or those arising from German food legislation.

The skilled person in the particular field of work therefore knows which particular regulations must be deemed relevant for the application and can therefore directly establish what upper limit for the total ash content and which upper limits for substances and substance classes exist and are to be observed.

In the specific case of exercising the present invention, the person skilled in the art will ascertain, usually by reference to the relevant regulations, firstly the permissible total ash content and the particular upper limits for the respective polymer and then calculate the permissible amount of antioxidant. Likewise, he will determine by generally known methods the actual total ash content and the respective content amount of the polymer without the treatment. From the difference in contents without the treatment and the permissible upper limits according to the relevant regulations, a person skilled in the art can directly calculate the maximum addition amount of antioxidant for this polymer. Usually, for the addition amount, he will establish a safety margin of about 5 to 10% based on the maximum addition amount in order to be able to take into consideration fluctuations in production. It is easy for a person skilled in the field to determine the normal variations in the chosen process and then set an appropriate safety margin for this process.

According to the invention, after the polymerization, reducing agent and/or further antioxidant can additionally be added to the low-peroxide polymer. As a result, the stability against oxidation and/or further peroxide formation can be again improved.

"Further antioxidant" may be an individual compound or a mixture of two or more antioxidants. Such compounds are also referred to as free-radical scavengers and, within the context of this invention, encompassed by the term "further antioxidant".

"Reducing agent" may be an individual compound or a mixture of two or more reducing agents. If reducing agents and further antioxidant are used, this addition can take place in parallel or sequentially. Preferably, the addition takes place sequentially. Particularly preferably, firstly the addition of reducing agent takes place and then the addition of further antioxidant.

Reducing agent and/or further antioxidant can be added to the polymer, which is present in liquid, in solid form, dispersed or dissolved in a suitable solvent. A preferred solvent is the same as the liquid used in each case for the preparation. Particular preference is given to water.

The addition of reducing agent and/or further antioxidant generally takes place at temperatures of from 10 to 100° C., preferably 15 to 80° C. and particularly preferably 20 to 60° C. The preferred pH range for the addition is 3 to 11, preferably 6 to 10, particularly preferably 7 to 9.

Preferably, the reducing agent is added first, then a waiting time generally follows, expediently at elevated temperature. Within this waiting time, the polymer solution or dispersion is kept at elevated temperature from 20 to 90° C., preferably at 40 to 80° C., and preferably thoroughly mixed. This waiting time usually lasts a few minutes up to several hours, preferably at least 5 minutes, particularly preferably at least 30 minutes and very particularly preferably at least 60 minutes, but usually not longer than 4 hours, preferably not longer than 2 hours.

Further antioxidant is then added, optionally followed by a further waiting time, preferably likewise with thorough mixing. This further waiting time after adding further antioxidant usually lasts a few minutes up to several hours, preferably at least 5 minutes, particularly preferably at least 15 minutes and very particularly preferably at least 30 minutes, but is usually not more than 2 hours and preferably not more than 1 hour.

As the volume of polymer solution or dispersion increases, so too does the waiting time period in each case. The specified times are already suitable for commercial production in a stirred reactor in a scale of several tonnes of polymer.

An adaptation to other processes is therefore readily possible for a skilled person.

Suitable reducing agents are, for example, sulfur dioxide, sulfurous acid or sulfites, preferably alkali metal or alkaline earth metal sulfites, for example potassium sulfite, potassium hydrogen sulfite, lithium sulfite, lithium hydrogen sulfite, sodium sulfite or sodium hydrogen sulfite, and ammonium sulfite and ammonium hydrogen sulfite, particular preference being given to sodium sulfite, sodium hydrogen sulfite and sulfur dioxide. Very particular preference is given to sulfur dioxide as aqueous solution.

If reducing agent and/or further antioxidant are to be used, then even small amounts suffice. Reducing agent can be used, for example, in amounts of from 0.005 to 1% by weight, based on solid polymer, preferably at least 0.01% by weight and particularly preferably at least 0.03% by weight, preferably up to 0.5% by weight and particularly preferably up to 0.20% by weight. Further antioxidant can be used, for example, in amounts of from 0.01 to 1% by weight, based on solid polymer, preferably at least 0.03% by weight and particularly preferably at least 0.05% by weight, preferably up to 0.5% by weight and particularly preferably up to 0.25% by weight.

Suitable further antioxidant which can be used according to the invention is known, for example, as antioxidant from WO2010/072640, to which reference is expressly made here. Suitable as further antioxidant are, for example: ascorbic acid, erythorbic acid, nordihydroguaiaretic acid, ethoxyquin, bisabolol, ascorbyl palmitate or BHT ("butylhydroxytoluene": 2,6-di-tertiary-butyl-4-methylphenol), derivatives and salts of these substances or mixtures of the aforementioned substances.

It is also possible, for example, to use ammonium, alkali metal, alkaline earth metal salts of, for instance, ascorbic acid, such as ammonium ascorbate, sodium ascorbate or magnesium ascorbate or mixtures thereof. Esters of, for example, ascorbic acid with inorganic or organic acids, such as ascorbyl carbonate, ascorbyl phosphate, ascorbyl sulfate, ascorbyl stearate or ascorbyl palmitate, and also the ammonium, alkali metal, alkaline earth metal salts thereof, for example sodium ascorbyl phosphate or sodium ascorbyl palmitate, are likewise suitable. The analogous compounds of erythorbic acid can likewise be used. Mixtures of all of the aforementioned compounds can likewise be used.

As further antioxidant, preference is given to using ascorbic acid, erythorbic acid, alkali metal, alkaline earth metal or ammonium salts of these acids, derivatives thereof, such as esters, ethers or amides or mixtures of the aforementioned substances. Particular preference is given to using ascorbic acid or erythorbic acid, and very particular preference is given to using just ascorbic acid.

When using reducing agent and further antioxidant, particular preference is given to using sulfur dioxide as reducing agent and ascorbic acid and/or erythorbic acid as further antioxidant, in particular just sulfur dioxide and ascorbic acid.

Of particular preference in the post-treatment of water-insolubly crosslinked polymer according to the invention such as water-insolubly crosslinked polyvinylpyrrolidone, is only the addition of further antioxidant, very particularly preferably of ascorbic acid, without adding reducing agent.

The addition of reducing agent and further antioxidant takes place in each case preferably with thorough mixing such as stirring. Mixing by blowing in a gas, for example a protective gas, or by circulating by pumping with and without static mixers is also possible, as are combinations of two or more methods for thorough mixing.

The polymerization and optionally a physical and/or chemical post-treatment such as acidic hydrolysis, stripping, distillation, adsorption and/or post-treatment with reducing agent and/or further antioxidant takes place expediently under a protective-gas atmosphere. Protective-gas atmosphere is the term used to refer to the complete or partial replacement of air by inert gases such as, for example, nitrogen, helium, argon and/or carbon dioxide or mixtures thereof. A suitable protective gas (synonymous with "inert gas") is preferably nitrogen. Preferably, protective gas, in particular nitrogen, is used such that the oxygen content in the system is less than 50000 ppm, preferably less than 20000 ppm and particularly preferably less than 10000 ppm. Usually, an oxygen content of less than 5000 ppm, preferably less than 2000 ppm or even less than 1000 ppm, oxygen content is regularly achieved (ppm: based on gas volume; 5000 ppm correspond to 0.5% by volume).

In a particularly preferred embodiment, the polymer is prepared under a nitrogen protective-gas atmosphere with less than 50000 ppm, preferably less than 5000 ppm, of oxygen.

In a preferred embodiment, the post-polymerization, the physical, chemical or other post-treatment such as washing and/or the post-treatment with reducing agent and/or further antioxidant takes place under a nitrogen protective-gas atmosphere with less than 50000 ppm, preferably less than 5000 ppm, of oxygen.

After the polymerization and possible subsequent post-treatment, water-insolubly crosslinked popcorn polymer such as in particular PVPP is usually separated off from the solvent, in most cases by filtering. This is usually followed by washing one or more times, generally with purified water. Then, in most cases, the water content is reduced by, for instance, pressing the polymer.

The polymer can—if desired—be converted to solid polymer, for example pourable polymer, by drying following polymerization and optional post-treatment. Drying methods are known to the skilled person.

The drying can take place, for example, by spray-drying, drum-drying or another warm-air or contact-heat drying. Drying by means of vacuum-drying or freeze-drying is also possible. All other methods for drying are in principle likewise suitable. Drying methods with spraying such as spray-drying and by means of contact surfaces such as drum drying are preferred drying methods.

However, it is also possible to dispense with the drying, for example if polymer solutions or dispersions are desired.

Drying under protective gas is possible and further improves the result of the treatment. Preferably, the drying of polymer, in particular of water-insolubly crosslinked vinyllactam polymer, takes place by means of warm gas, in particular with protective gas such as nitrogen.

It is a particular advantage of the present invention that even when dispensing with a protective gas during drying, the vinyllactam polymer has improved long-term stability.

Solid vinyllactam polymer is usually packaged directly after drying and optional subsequent sieving steps in suitable packaging materials. In principle, it is possible to use all packaging materials which are suitable and permissible for pharmaceutical, food or cosmetics applications or for the application desired in each case.

Of course materials which are of low permeability, or are virtually impermeable, for oxygen are advantageous. By avoiding or minimizing vinyllactam polymer contact with oxygen during storage, the further oxidation of the polymer is again further reduced.

In addition to the optional subsequent addition of reducing agent and/or further antioxidant to the vinyllactam polymer and/or a drying under protective gas, the packaging of the vinyllactam polymer can of course also additionally take place with nitrogen or noble-gas gassing or by means of vacuum application. Naturally, the sole use of inert packaging materials, such as in particular of materials and films which have little or virtually no permeability for oxygen also further improves the stability of the vinyllactam polymer against oxidation and peroxide build-up. Packaging under protective gas in such inert packaging materials naturally further improves the result. Such packaging materials and packaging methods are known, for example, from DE202009000692U1 and WO 2010/072640, to which reference is expressly made here in its entirety.

Low-peroxide crosslinked vinyllactam polymer obtainable or obtained by the process according to the invention is particularly advantageously suitable for use in pharmaceutical or cosmetic preparations or for use in food and semi-luxury food technology. Allergic reactions or other incompatibilities, as can arise as a result of heavy metals or enzymes, are thereby completely avoided.

The polymer can also be used advantageously, for example in conjunction with active ingredients, in the field of agriculture or veterinary medicine, such as animal feed, animal health and crop protection.

The low-peroxide crosslinked vinyllactam polymer has likewise proven advantageous for use in technology, for example medical technology such as dialysis membranes or other substances, equipment or apparatuses which come into contact with the body or body fluids or pass into the body or are introduced into the body. Likewise advantageous is the use in applications which are critical as regards color and/or odor, such as hair cosmetics, adhesives or surface coating, for example for paper and transparent plastics.

Particular preference is given to the use of crosslinked vinyllactam polymer in pharmaceutical formulations. Vinyllactam polymer is particularly suitable for solid dosage forms.

Vinyllactam polymer preferred for such a use in pharmaceutical formulations is water-insolubly crosslinked vinylpyrrolidone polymer and vinylpyrrolidone-vinyl acetate polymer. Very particular preference is given to water-insolubly crosslinked polyvinylpyrrolidone.

Besides low-peroxide crosslinked vinyllactam polymer according to the invention and active ingredient, such formulations usually also comprise further auxiliaries customary and known to the person skilled in the art such as binders, disintegration promoters, tablet disintegrants, surfactants, taste masking agents, lubricants, film coatings, fillers and/or sweeteners.

In principle, all known active ingredients are suitable as active ingredients. Possible active ingredients are disclosed, for example, in US 2008-0181962 in paragraph [0071], from the seventh-last line to the end of this paragraph, to which reference is expressly made here. In principle, all fields of application are possible, for example those specified in US 2001-0010825 on page 1, paragraph [0029], last line, to paragraph [0074] end, and the examples of active ingredients specified therein, to which reference is likewise expressly made here.

In view of the prior art, it was completely surprising that organic substance acting as antioxidant can already be present before and/or during the free-radical polymerization, without generating any, or any noteworthy, amounts of by-product. It was likewise surprising that the free-radical polymerization, in particular the popcorn polymerization, was not hindered or delayed in a noteworthy manner. It was particularly surprising that the yields of vinyllactam polymer, in particular popcorn polymer, were in practice just as high as without the addition of organic substance acting as antioxidant. Nevertheless, a reduction in the peroxide contents which is very significant and stable in particular over a prolonged period of storage in air was observed.

Within the context of this invention, "noteworthy amounts" is used to refer to those amounts which can no longer be tolerated when using the polymer in the particular field of application on account of the "relevant regulations".

Within the context of this invention, "hinder to a noteworthy extent" means that the delay in the start of the popcorn polymerization is less than 30 minutes, preferably less than 15 minutes, particularly preferably less than 10 minutes, and, for example, no measurable delay at all occurs compared with a polymerization without the addition of antioxidant.

In particular, it was surprising that the popcorn polymerization is possible at all in the presence of organic substance acting as antioxidant. This was in particular therefore unexpected since, in the view of the specialist world, the popcorn polymerization spontaneously starts by itself without the addition of radical-forming initiators. Contaminations of the monomers with stabilizers (which serve to stabilize the monomers during storage), even in small amounts, are therefore a serious problem for the popcorn polymerization, for which reason stabilizers for the monomers, according to the experts, either have to be avoided completely or have to be removed as completely as possible prior to the popcorn polymerization. Such substances usually used as stabilizers for monomers, however, are typical antioxidants, for example 2,6-di-tertiary-butyl-4methylphenol and 4-hydroxy-2,2,6,6-tetramethylpiperidin-1-oxyl.

It was therefore entirely surprising to establish that the popcorn polymerization starts virtually without any delay with amounts of from 0.01 up to 3% by weight of organic substance active as antioxidant used according to the invention (based on the polymer solids content).

It was likewise found that the polymer yields that can be achieved of, for example, popcorn polymer, in particular water-insolubly crosslinked vinylpyrrolidone polymer, such as PVPP, are unexpectedly precisely as high as without the addition of antioxidant used according to the invention, and are usually at least 90, preferably at least 95, particularly preferably at least 98, percent by weight and very particularly preferably at least 99.5% by weight, and even complete conversion, i.e. greater than 99.99% by weight (based in each case on the monomers used) can be achieved.

Surprisingly, it has also been found that the use of the methods known from DE202009000692U1 and WO 2010/072640 is not necessary for the present invention. Rather, a low-peroxide crosslinked vinyllactam polymer obtainable or prepared by the process according to the invention has excellent long-term stability against the rise in peroxide content during storage, even if the packaging materials are oxygen-permeable to a greater extent, if the packaging is not tight against the entry of oxygen, and/or the vinyllactam polymer is located in an atmosphere with high oxygen content of more than 2% by volume ranging to normal air and its known oxygen content.

This indicates to a particular extent the protective function of the stabilization of vinyllactam polymer as a result of the process according to the invention for the preparation of low-peroxide crosslinked vinyllactam polymer in the presence of organic substance acting as antioxidant compared to the stabilization methods known hitherto.

In particular, stability upon thermal stress and stability in oxygen-containing medium are considerably improved without, however, having the disadvantages of the stabilization additives and methods specified therein that are known from the prior art.

One advantage of the low-peroxide crosslinked vinyllactam polymer according to the invention is therefore its stability, i.e. the properties such as peroxide content, molar mass, color and/or odor which it exhibits directly after preparation barely change over the course of time. The determination of the peroxide content in particular can serve as a measure of the grade of the vinyllactam polymer. In addition, odor and/or color and—in the case of water-solubly crosslinked polymers—also molar mass, K value and viscosity of solutions can be used.

The peroxide content in the vinyllactam polymer is determined here by means of iodometry, by means of titanyl reagent or by means of cerium reagent. The methods are known to the skilled person, for example from Ph.Eur.6. All methods produce comparable results.

Low-peroxide crosslinked vinyllactam polymer according to the invention prepared or obtainable by the process according to the invention has here, in each case based on the polymer solids content, a peroxide content determined two days after preparation of not more than 50 ppm, preferably not more than 20 ppm and particularly preferably not more than 10 ppm, and/or a peroxide content determined at any desired time within up to three months after preparation of not more than 100 ppm, preferably not more than 50 ppm, particularly preferably not more than 20 ppm and very particularly preferably not more than 10 ppm, such as, for example, not more than 1 ppm, the peroxide content being determined by means of iodometry in accordance with Ph. Eur.6.

In particular, such a low-peroxide crosslinked vinyllactam polymer according to the invention and prepared or obtainable by the process according to the invention has residual monomer contents—based on the polymer solids content—of each monomer used of not more than 100 ppm, preferably not more than 50 ppm, particularly preferably not more than 20 ppm, very particularly preferably not more than 10 ppm and in particular not more than 5 ppm, such as, for example, less than 1 ppm.

The K value (Fikentscher K value; see for example Bühler, "Polyvinylpyrrolidone—Excipient for Pharmaceuticals", Springer, 2005, page 40 to 41) is a measure of the solution viscosity under defined conditions. Consequently, it is a direct measure of the molar mass. If the molar mass changes, for example as a result of oxidative processes, this leads to a build-up in molar mass (leads to K value increase) or to molar mass reduction (leads to K value decrease) and thus to a change in the K value.

The build-up and degradation of peroxides in the polymer is one such oxidative process. Consequently, polymer prepared or obtainable by the process according to the invention also has a stability of the K value and thus of the molar mass upon storage. Since the molar mass and thus the K value are directly linked to the solution viscosity, the solution viscosity also consequently does not change or changes only to a very much lower extent than without the process according to the invention.

Low-peroxide water-solubly crosslinked vinyllactam polymer prepared or obtainable by the process according to the invention exhibits, following storage at room temperature, a change in K value, determined at any desired time within 3 months following preparation, of usually less than 10%, preferably less than 5% and particularly preferably less than 2%, based on the starting K value of the polymer, the starting K value being determined two days following preparation of the polymer in accordance with Fikentscher.

For insolubly crosslinked polymer, as a skilled person is aware, such a K value cannot be determined and is therefore also not stated.

The color of the polymer is important depending on the application and should usually be as slight as possible, preferably completely colorless. The color can be determined for example by means of spectroscopic methods and be stated for example as Hazen color number or iodine color number or as color classification according to the German Pharmacopeia. Determination of the color in accordance with Hazen etc. is familiar to the skilled person.

Oxidative processes during build-up and degradation of peroxides in the polymer also produce color-imparting components which change, usually impair, the color of the polymer, i.e. depending on the color scale, usually have significantly higher color values than previously.

As a result of the process according to the invention, the peroxide build-up is drastically reduced or even prevented and thus so too is the degradation. Consequently, changes in the color of the polymer are reduced or even completely prevented.

As a result, low-peroxide crosslinked vinyllactam polymer produced or obtainable by the process according to the invention also achieves a stability in the color of the polymer upon storage. Low-peroxide solubly crosslinked vinyllactam polymer prepared or obtainable by the process according to the invention therefore exhibits, following storage at room temperature, a color number increase in the case of the Hazen color (also called "Hazen color number" or "cobalt platinum color number"), determined at any desired time within 3 months after preparation, of usually less than 10%, preferably less than 5%, particularly preferably less than 3% and very particularly preferably of 1% or less, based on the starting color value, which is determined two days after preparation.

The color according to Hazen is important in particular only for solubly crosslinked polymers and here in particular for cosmetic applications.

In the pharmaceutical sector, on the other hand, the color is determined in accordance with the requirements in the pharmacopeia and monographs. The color of the polymers according to the invention which can be achieved corresponds here to the requirements of all relevant provisions in Japan, USA and Europe in the most current version from 2010 and may even significantly surpass the requirements, i.e. have less of a color than required. These requirements and the relevant measurement methods are sufficiently known to the person skilled in the art. Low-peroxide insolubly crosslinked vinyllactam polymer prepared or obtainable by the process according to the invention therefore exhibits, following storage at room temperature, a color number increase for the color according to Ph.Eur. 6 determined at any desired time within 3 months after preparation, of usually less than 3 scale values, preferably less than 2 scale values, particularly preferably less than 1 scale value and very particularly preferably no deviation, based on the starting color value, which is determined two days after preparation.

The odor of the polymer is likewise important depending on the application. The polymer should not have a bad odor. Likewise, no bad odor should arise upon storage. The odor of the polymer can be determined for example by headspace GC method using odor profiles or by olfactory means, for example using the human nose (for instance by people trained for this purpose, such as perfumers). As a result of oxidative processes within the context of peroxide build-up and breakdown, not only are color-imparting substances formed, but also odor-forming substances which, for instance, lead to a "musty" odor.

Low-peroxide crosslinked vinyllactam polymer according to the invention prepared or obtainable by the process according to the invention exhibits only a very reduced or virtually no change to undesired odors, determined at any desired time within 3 months after preparation.

"Preparation" refers to the date which is usually stated by the manufacturers of polymers on the packaging of the polymer, normally on the label. This is either the actual production date, i.e. the date on which the polymerization and all of the subsequent steps up to the saleable form were completed, or the date of packaging of the saleable form in the sales packaging. These dates are normally only one to two days apart.

Consequently, within the context of the present invention, "preparation" is understood as meaning the timepoint 48 hours after polymerization is complete.

The following examples illustrate the invention in an exemplary and nonlimiting manner.

EXAMPLES

The peroxide content was determined for all samples by the iodometric method as in European Pharmacopeia edition 6 (Ph.Eur. 6). The numbers stated refer to the ppm values (1 ppm corresponds to 1 mg of peroxide/kg of polymer), calculated and stated as hydrogen peroxide equivalent.

Measurement parameter: peroxide content (expressed in ppm or mg of H2O2 equivalent/kg of polymer).

Measurement principle: peroxides are reduced with potassium iodide and the iodine which is formed in the process is detected photometrically at 500 nm.

Working range w(H2O2): 6 to 500 mg/kg (6 to 500 ppm)

Detection: UV/VIS spectrometer, for example model Lambda 25 from Perkin Elmer

Sample preparation: 1.5 to 2 g of sample were weighed in accurately to 0.1 mg and dissolved in about 20 ml of a 1:1 mixture of trichloromethane and glacial acetic acid. For more rapid dissolution, the vessel was placed in an ultrasound bath for about 5-10 min. Then, 0.5 ml of saturated Kl solution was added, and the solution was then topped up to 25 ml with trichloromethane/glacial acetic acid and thoroughly mixed.

For the reagent blank value, 24.5 ml of the 1:1 mixture of trichloromethane and glacial acetic acid were admixed with 0.5 ml of the saturated Kl solution.

After a waiting time of 5 min, measured from the addition of the saturated Kl solution, measurement was carried out against the entrained reagent blank value. The measurement was carried out at the edge of the band of the iodine absorption (with a maximum at 359 nm), because in this region no disturbances arise as a result of the matrix.

Measurement parameters: wavelength: 500 nm; slit: 2 nm; layer thickness of the solution: 5 cm; measurement temperature: 20 to 25° C., measurement accuracy: plus/minus 8%.

Calculation:

$$w(H_2O_2) = \frac{E_{5cm} - b}{a} \times \frac{V}{m}$$

where
$w(H_2O_2)$=mass fraction of peroxide in mg/kg (=in ppm)
$E_{5cm}$=extinction at a layer thickness of 5 cm
b=ordinate intercept from the calibration
a=increase in the regression lines from the calibration
m=initial weight of sample in g
V=volume of the sample solution (here: 25 ml)

Calibration:

Six calibration solutions were prepared as follows: approximately 300 mg of 30.2% hydrogen peroxide solution were weighed into a 100 ml measuring flask and topped up to 100 ml with a 1:1 mixture of trichloromethane and glacial acetic acid. Six volumes of stock solution (0.01 ml, 0.02 ml, 0.05 ml, 0.1 ml, 0.2 ml and 0.5 ml) were taken and to each was added approximately 20 ml of trichloromethane/glacial acetic acid (1:1). Next, 0.5 ml of saturated Kl solution was added and the volume was in each case made up to 25 ml with trichloromethane/glacial acetic acid. This gave six solutions which comprised about 0.3 to 18 mg of hydrogen peroxide per liter. Five minutes after the addition of the Kl reagent, the solutions were measured as described above against an entrained reagent blank value. From the extinctions obtained for the calibration solutions, a regression line of the form $E_{5cm}$=a*beta+b was calculated, where $E_{5cm}$ is the extinction at a layer thickness of 5 cm and beta is the mass concentration of hydrogenperoxide in the calibration solutions (stated in mg/l). The calculation here produced the function $E_{5cm}$=0.0389*beta+0.0013 with a correlation coefficient of $R^2$=0.9998.

Percentages are % by weight. Data in "ppm" are based on the weight (1 ppm=1 mg/kg). Data in percent by weight and ppm refer in each case to solid polymer (the polymer solids content), i.e. the amount of polymer which is present in a solution or dispersion or suspension.

In all of the examples, the polymerization was carried out under nitrogen (technical grade) with an oxygen content of from about 1 to at most 5% by volume. Further work-up such as drying and storage was carried out under air. The polyethylene (PE) bottles used were screw-top bottles customary for powders.

General Procedure 1:

Preparation according to the invention of a water-insolubly crosslinked polyvinylpyrrolidone (PVPP) of N-vinylpyrrolidone and N,N'-divinylethyleneurea in the presence of antioxidant:

In a 3 liter reaction vessel with heating jacket and drain tap at the bottom, 1600 g of distilled water, 151.8 g of N-vinylpyrrolidone, 3.52 g of N,N'-divinylethylene urea, 1.52 g of DL-alpha-tocopherol and 1.3 g of 5% strength sodium hydroxide solution were introduced as initial charge and heated to 80° C. with stirring at a rotational speed of 100 rpm; during the heating and the polymerization, nitrogen, which was fed into the reaction mixture at the bottom of the polymerization vessel, was passed through the solution. The flow rate was 12 l/h. After the temperature of the reaction mixture had increased to 80° C., 0.01 g of sodium dithionite (dissolved in 5 g of water) was added. The mixture was kept at 80° C. and stirred continuously. The popcorn polymerization started after ca. 30 minutes and was complete after 3 hours (evident inter alia from the heat of reaction subsiding). The suspension was then filtered off and washed with water in order to remove impurities such as soluble polymer and nonpolymerized monomers. The polymer was dried at 80° C. in a drying cabinet for 3 days. The yield of popcorn polymer was more than 95%. The peroxide content was determined directly after treatment and also after storage for 3 and 6 months in sealed PE screw-top bottles. The results are summarized in table 1 below.

The other experiments were carried out analogously, replacing DL-alpha-tocopherol in each case by the amount of antioxidant stated in each case in table 1 (amount in percent by weight, in each case based on the polymerizable monomer).

Comparative Examples to General Procedure 1

The comparative examples to general procedure 1 were carried out analogously to this, but with the antioxidants and antioxidant amounts as stated in table 2.

General Procedure 2 (Comparative Examples)

Subsequent treatment of a polymer with antioxidant (table 3)

A freshly prepared 8.5% strength suspension of crospovidone in water (prepared by general procedure 1 but without adding antioxidant) was admixed at 50° C. with different amounts of different antioxidants (see table 3; amount of antioxidant in percent by weight, in each case based on the polymerizable monomer) and the solution was stirred for one hour. The crospovidone was then filtered off and dried in a vacuum drying cabinet under nitrogen at 60° C. for 16 hours. The pulverulent crospovidone was then poured into PE bottles with screw-cap closure. The peroxide content was determined directly after treatment and also after storage for 3 months. Amount and type of antioxidant used (based on polymer solids content) and the results are listed in table 3 below.

Substances used:
Prostab 5415: Manufacturer: BASF SE
Chemical name: bis(2,2,6,6-tetramethylpiperidin-1-oxyl-4-yl)decanedioate
Prostab 5198: Manufacturer: BASF SE
Chemical names: 4-hydroxy-tempo; 4-hydroxy-2,2,6,6-tetramethylpiperidin-1-oxyl
Tinogard Q: Manufacturer: BASF SE
Chemical name: tris(tetramethylhydroxypiperidinol) citrate
Vitamin E: Vitamin E acetate, manufacturer: BASF SE
Data in the tables:
Type of example: According to the invention="I"
  Comparative experiment="C"
% by weight of antioxidant: based on polymerizable monomers
yield: in % by weight of polymeric solid after drying
peroxides in ppm/time of measurement: peroxide contents in ppm (based on weight of polymer solid) at the time of measurement (2 days, 3 months or 6 months following preparation of the polymer)
nd: not determined

TABLE 1

| Type of example | % by wt. of anti-oxidant | Antioxidant | Yield (% by wt.) | Peroxides in ppm; 2 days | Peroxides in ppm; 3 months | Peroxides in ppm; 6 months |
|---|---|---|---|---|---|---|
| C | 0 | Blank value (without antioxidant) | 99.1% | 121 | 173 | 221 |
| I | 0.05 | DL-alpha-tocopherol | 96.5% | 25 | 99 | 75 |
| I | 0.1 | DL-alpha-tocopherol | 100.0% | <20 | <20 | <20 |
| I | 0.5 | DL-alpha-tocopherol | 97.9% | <20 | <20 | <20 |
| I | 2 | DL-alpha-tocopherol | 96.1% | <20 | <20 | nd |
| I | 1 | Vitamin E | 94.8% | <20 | <20 | <20 |
| I | 0.1 | (+)-catechin hydrate | 100.0% | 75 | 80 | nd |
| I | 0.5 | 2,6-di-tert-butyl-4-methylphenol | 99.6% | <20 | 48 | 77 |
| I | 1 | 2,6-di-tert-butyl-4-methylphenol | 93.7% | 51 | 79 | nd |
| I | 0.1 | Uric acid | | 25 | 61 | nd |
| I | 0.1 | Na ascorbate | 100.0% | <20 | 52 | 48 |
| I | 1 | Na ascorbate | 97.2% | <20 | <20 | <20 |
| I | 0.1 | N-acetyl-L-cysteine | 100.0% | 37 | 79 | 100 |
| I | 0.5 | N-acetyl-L-cysteine | 97.1% | <20 | <20 | 26 |
| I | 0.1 | Nordihydroguaiaretic acid | 97.5% | <20 | <20 | <20 |
| I | 0.1 | Propyl 3,4,5-trihydroxybenzoate | 95.8% | 26 | 43 | 67 |
| I | 0.1 | Prostab 5198 | 100.0% | <20 | <20 | <20 |
| I | 0.1 | Prostab 5415 | 100.0% | <20 | <20 | <20 |
| I | 0.1 | Tinogard Q | 100.0% | <20 | <20 | <20 |
| I | 0.5 | RS-lipoic acid | 96.0% | 80 | 90 | nd |
| I | 0.5 | Prostab 5415 | 90.1% | <20 | <20 | 24 |

TABLE 2

| Type of example | % by wt. of antioxidant | Antioxidant | Yield (% by wt.) | 2 days | 3 months | 6 months |
|---|---|---|---|---|---|---|
| C | 0 | Blank value (without antioxidant) | 99.1% | 121 | 173 | 221 |
| C | 5 | DL-alpha-tocopherol | | not started | | |
| C | 0.5 | RS-lipoic acid | 96.0% | 80 | 90 | nd |
| C | 0.5 | (+)-catechin hydrate | | not started | | |
| C | 0.1 | 2,6-di-tert-butyl-4-methylphenol | 96.5% | 100 | 183 | nd |
| C | 0.1 | Ascorbic acid | 97.4% | 226 | nd | nd |
| C | 0.5 | Ascorbic acid | | not started | | |
| C | 0.1 | Ethoxyquin | 90.8% | 47 | 114 | nd |
| C | 0.5 | Ethoxyquin | | not started | | |
| C | 0.5 | Uric acid | | not started | | |
| C | 0.1 | L-glutathione reduced | 98.4% | 316 | nd | nd |
| C | 0.5 | L-glutathione reduced | 97.7% | 352 | nd | nd |
| C | 1 | L-glutathione reduced | | not started | | |
| C | 0.5 | Na ascorbate | 91.2% | 256 | nd | nd |
| C | 1 | N-acetyl-L-cysteine | | not started | | |
| C | 0.1 | Sodium sulfite | 97.5% | 122 | 193 | nd |
| C | 0.5 | Sodium sulfite | 95.6% | 95 | 153 | nd |
| C | 1 | Sodium sulfite | 89.5% | 168 | nd | nd |
| C | 0.2 | Nordihydroguaiaretic acid | 97.2% | Solution and polymer brown | | |
| C | 0.5 | Propyl 3,4,5-trihydroxy-benzoate | 80.3% | Solution yellow | | |
| C | 1 | Propyl 3,4,5-trihydroxy-benzoate | | not started | | |
| C | 0.5 | Prostab 5198 | | not started | | |
| C | 0.1 | Rapeseed oil | 98.0% | 146 | nd | nd |
| C | 0.5 | Rapeseed oil | 100.0% | 84 | 160 | nd |
| C | 1 | Rapeseed oil | 100.0% | 207 | nd | nd |
| C | 0.1 | RS-lipoic acid | 95.7% | 334 | nd | nd |
| C | 1 | RS-lipoic acid | | not started | | |
| C | 0.01 | Tinogard Q | 91.4% | 168 | nd | nd |
| C | 0.5 | Tinogard Q | | not started | | |
| C | 1 | Tinogard Q | | not started | | |
| C | 0.1 | Vitamin Q 10 | 99.0% | 172 | nd | nd |
| C | 0.5 | Vitamin Q 10 | 100.0% | 122 | nd | nd |
| C | 1 | Vitamin Q 10 | 95.4% | Powder is yellow | | |

TABLE 3

Subsequent addition of antioxidant to the finished polymer

| Type of example | % by wt. of anti-oxidant | Antioxidant | Yield (% by wt.) | 2 days | 3 months | 6 months |
|---|---|---|---|---|---|---|
| C | 0 | Blank value (no antioxidant) | 99.1% | 121 ppm | 173 ppm | 221 ppm |
| C | 0.1 | Sodium ascorbate | 99.1% | 111 | 298 | nd |
| C | 0.1 | Sodium ascorbate | 99.1% | 111 | 298 | nd |
| C | 0.1 | Sodium ascorbate | 99.1% | 111 | 298 | nd |
| C | 0.1 | Vitamin E | 99.1% | 151 | 351 | nd |
| C | 0.1 | Vitamin E | 99.1% | 151 | 349 | nd |
| C | 0.1 | Vitamin E | 99.1% | 151 | 360 | nd |
| C | 0.1 | Tinogard Q | 99.1% | 306 | 387 | nd |
| C | 0.1 | Rapeseed oil | 99.1% | 337 | 483 | nd |
| C | 0.1 | 2,6-di-tert-butyl-4-methylphenol | 99.1% | 79 | 264 | nd |
| C | 0.1 | Propyl 3,4,5-trihydroxybenzoate | 99.1% | 433 | nd | nd |
| C | 0.1 | N-acetyl-L-cysteine | 99.1% | 150 | 395 | nd |
| C | 0.1 | Prostab 5198 | 99.1% | 264 | 387 | nd |
| C | 0.1 | Prostab 5415 | 99.1% | 273 | 389 | nd |

The invention claimed is:

1. A process for the preparation of low-peroxide, water-insolubly crosslinked vinyllactam polymer by free-radical proliferous polymerization, comprising carrying out the polymerization in the presence of at least one organic substance acting as antioxidant and a crosslinker, wherein the crosslinker is produced in a step prior to the polymerization or is added to the polymerization, and wherein the at least one organic substance is selected from the group consisting of one or more tocopherols, catechin hydrate, uric acid, propyl 3,4,5-trihydroxybenzoate, 4-hydroxy-2,2,6,6-tetramethylpiperidin-1-oxyl, tris(tetramethylhydroxypiperidinol) citrate, N-acetylcysteine, bis(2,2,6,6-tetramethylpiperidin-1-oxyl-4-yl)decanedioate and 1,2-diothiolane-3-pentanoic acid.

2. The process according to claim 1, wherein the crosslinker is produced from vinylpyrrolidone in the presence of a strong base in a step prior to the polymerization.

3. The process according to claim 1, wherein the water-insolubly crosslinked vinyllactam polymer is water-insolubly crosslinked polyvinylpyrrolidone (PVPP).

4. The process according to claim 1, wherein the water-insolubly crosslinked vinyllactam polymer is a water-insolubly crosslinked vinylpyrrolidone copolymer with vinylimidazole, vinylcaprolactam and/or vinyl acetate.

5. The process according to claim 1, wherein the crosslinker is N,N'-divinylethylene urea.

6. The process according to claim 1, wherein the polymerization is carried out in aqueous medium or as bulk polymerization.

7. The process according to claim 1, wherein the at least one organic substance is one or more members selected from the group consisting of tocopherols.

8. The process according to claim 1, further comprising: treating the water-insolubly crosslinked vinyllactam polymer with reducing agents; and then admixing the water-insolubly crosslinked vinyllactam polymer with a further antioxidant.

9. A process for the preparation of low-peroxide, water-insolubly crosslinked vinyllactam polymer by free-radical proliferous polymerization, consisting essentially of carrying out the following steps in succession:
   a) carrying out the polymerization in the presence of at least one organic substance acting as antioxidant and a crosslinker to obtain a water-insolubly crosslinked vinyllactam polymer, wherein the crosslinker is produced in a step prior to the polymerization or is added to the polymerization, and wherein the at least one organic substance is selected from the group consisting of one or more tocopherols, catechin hydrate, uric acid, propyl 3,4,5-trihydroxybenzoate, 4-hydroxy-2,2,6,6-tetramethylpiperidin-1-oxyl, tris(tetramethylhydroxypiperidinol) citrate, N-acetylcysteine, bis(2,2,6,6-tetramethylpiperidin-1-oxyl-4-yl)decanedioate and 1,2-diothiolane-3-pentanoic acid;
   b) optionally treating the water-insolubly crosslinked vinyllactam polymer with a reducing agent;
   c) optionally washing the polymer;
   d) optionally admixing the water-insolubly crosslinked vinyllactam polymer with a further antioxidant; and
   e) optionally drying the polymer.

10. The process according to claim 1, wherein the water-insolubly crosslinked vinyllactam polymer is then converted to a pulverulent polymer by drying.

11. The process according to claim 1, wherein the particle size distribution of the water-insolubly crosslinked vinyllactam polymer is adjusted to average particle sizes in the range from 1 to 1000 μm by introducing protective gas and/or by adding an oxygen scavenger.

12. The process according to claim 9, wherein
   b) the water-insolubly crosslinked vinyllactam polymer is treated with a reducing agent;
   c) the polymer is washed;
   d) the water-insolubly crosslinked vinyllactam polymer is admixed with a further antioxidant; and
   e) the polymer is dried.

13. The process according to claim 9, wherein
   b) the water-insolubly crosslinked vinyllactam polymer is treated with a reducing agent;
   c) the polymer is washed; and
   e) the polymer is dried.

14. The process according to claim 1, wherein the polymer obtained within the polymerization step is washed and subsequently dried.

15. The process according to claim 8, wherein the water-insolubly crosslinked vinyllactam polymer is then converted to a pulverulent polymer by drying.

* * * * *